United States Patent [19]

Wardell, Jr.

[11] Patent Number: 5,655,327
[45] Date of Patent: Aug. 12, 1997

[54] PURSE SEINE LINK

[75] Inventor: Myron Henry Wardell, Jr., Lititz, Pa.

[73] Assignee: Cooper Industries, Inc., Houston, Tex.

[21] Appl. No.: 361,890

[22] Filed: Dec. 22, 1994

Related U.S. Application Data

[63] Continuation of Ser. No. 151,715, Nov. 12, 1993, abandoned.

[51] Int. Cl.⁶ .............................. A01K 73/12; B61B 7/00
[52] U.S. Cl. .................. 43/14; 294/82.33; 24/115 L; 104/115; 105/151
[58] Field of Search ............... 294/82.31, 82.33, 294/82.2; 24/600.9, 601.1, 115 L, 136 A, 25; 104/112, 113, 115; 105/151; 43/14, 8

[56] References Cited

U.S. PATENT DOCUMENTS

| | | | |
|---|---|---|---|
| 2,639,535 | 5/1953 | Greske | 43/27.2 |
| 3,064,384 | 11/1962 | Lewis | 43/14 |
| 4,926,754 | 5/1990 | Feuz | 104/115 |
| 5,018,295 | 5/1991 | Taylor | 43/14 |
| 5,119,735 | 6/1992 | Jang | 105/151 |

FOREIGN PATENT DOCUMENTS

| | | | |
|---|---|---|---|
| 0078055 | 2/1951 | Norway | 104/112 |
| 0280359 | 4/1952 | Switzerland | 104/15 |

*Primary Examiner*—Joseph J. Hail, III
*Assistant Examiner*—James Miner
*Attorney, Agent, or Firm*—Burns, Doane, Swecker & Mathis LLP

[57] ABSTRACT

A purse seine link (10) having a roller head (30) attached to body (20) by head pivot (32). Latch mechanism (22) allows for one step release of roller head (30) to release cable (8).

17 Claims, 4 Drawing Sheets

PURSE SEINE LINK

This is a continuation of application Ser. No. 08/151,715 filed on Nov. 12, 1993, now abandoned.

BACKGROUND OF THE INVENTION

This invention relates in general to purse seine links for fishing nets and more particular to a swivel, roller head purse seine link.

In the past, it has been the conventional practice to employ a traveling eyelet in connection with movably supporting the marginal edge of a fishing net to a length of rigid support cable. The eyelets are used in serial fashion adjacent to one another. Each eyelet is connected to a portion of the fishing net so that all of the eyelets in combination support the entire fishing net. Floats are provided on the edge of the net so that the net is supported on the surface of the sea. The eyelets are primarily employed for supporting the net as the net is payed out from the stern of a boat or drawn back into the boat over its stern. Under such operating conditions, great wear and strain is placed on the eyelets due to the extremely heavy loading conditions and transferring as well as distribution of loads from the net to the supporting cable via the eyelets.

It has been the conventional practice to design an eyelet having a rigid cross member joining opposite sides of the eyelet at the upper end and providing a rounded bight at its lower end. The rigid cross member in combination with the top or upper end of the eyelet forms an opening through which the lower or pursing cable is disposed, and the cable rides on the eyelet frame itself, and in some instances, will ride against the rigid crossbar. A pursing cable is tied or laid against the semicircular rigid lower end of the frame of the eyelet. Using such a conventional eyelet causes extreme wear and strain on the eyelet since no parts of the eyelet move and the material of the eyelet is substantially fatigued so as to cause cracking, breaking and damage not only to the eyelet but to the pursing cable as well. Since there are no moving parts on the eyelet, lubricant such as greases and oils are manually placed on the external surfaces of the rigid bar as well as the curved lower portion or end in order to permit sliding of the cables they are against. However, the grease or oil is soon dissipated and metal to metal wearing takes place.

Therefore, a long standing need has existed to provide a novel traveling eyelet which includes antifriction means for reducing wear and damage between metal parts on which the eyelet is supported. Such an eyelet will have lubricating means and will include a construction permitting disassembly so that worn or damaged parts can be readily replaced.

Prior art attempts to solve this problem as shown in Jang et al., U.S. Pat. No. 5,119,735, have met with limited success. Jang et al. shows a roller which reduces wear previously found on the traveling eyelets. In addition, the cable could be removed by a retractable sleeve used to insert and remove the cable. While this is an improvement over the prior art, this has some problems. The removal of the link from the cable requires a five step process. A detent must be pressed, the sleeve slid back, the sleeve member pivoted out of the way, and the cable removed. The link then must be manually closed. This five step operation requires additional time which can be costly due to the warm temperature of the waters and the need to get the fish into the fish holding tanks as soon as possible. Additionally, it is a labor intensive operation because the detent must be pressed by hand. An additional problem is if the link accidentally opens during the net streaming operation, the open purse seine link acts like a fishing hook ripping large sections of the net. The fishing boat is then out of operation until the net can be repaired. A net with a large gap allows fish to escape reducing the yield, net set, plus the time to repair the net.

Another problem with the prior art is when the purse seine link is removed from the purse cable the tension of the net must be taken off the link prior to removing the link from the cable by hand. There is a danger to the operator at this point. If the mechanism to remove the strain from the net becomes temporarily disengaged, the operator could be injured while removing the link from the cable.

The operator, after he disconnects the link from the cable, takes the link and places it on a hook which is on the davit. If the link is not properly placed onto the hook, as the net is being pulled into the boat, the link can slip off the hook and hit the operator. In addition, when the link is put on the davit, the mechanism which relieves the strain from the net is disengaged from the net applying strain to the purse seine link. If the link is improperly hooked on to the davit, the removal of the strain support mechanism can cause the link to slip off the hook and can cause bodily damage to the davit operator.

SUMMARY OF THE INVENTION

The present invention solves many of the problems found in the prior art using a one step operation to remove the purse seine link from the purse cable. The purse seine link is struck with a hammer or mallet, opens at least automatically 20° and preferably approximately 30°, and falls away from the purse cable. This is accomplished by having a pivoting head which opens approximately 35°, having a roller flush with the lip of the head. The head is spring operated to close automatically after the cable falls away.

DETAILED DESCRIPTION OF THE INVENTION

Figure 1:
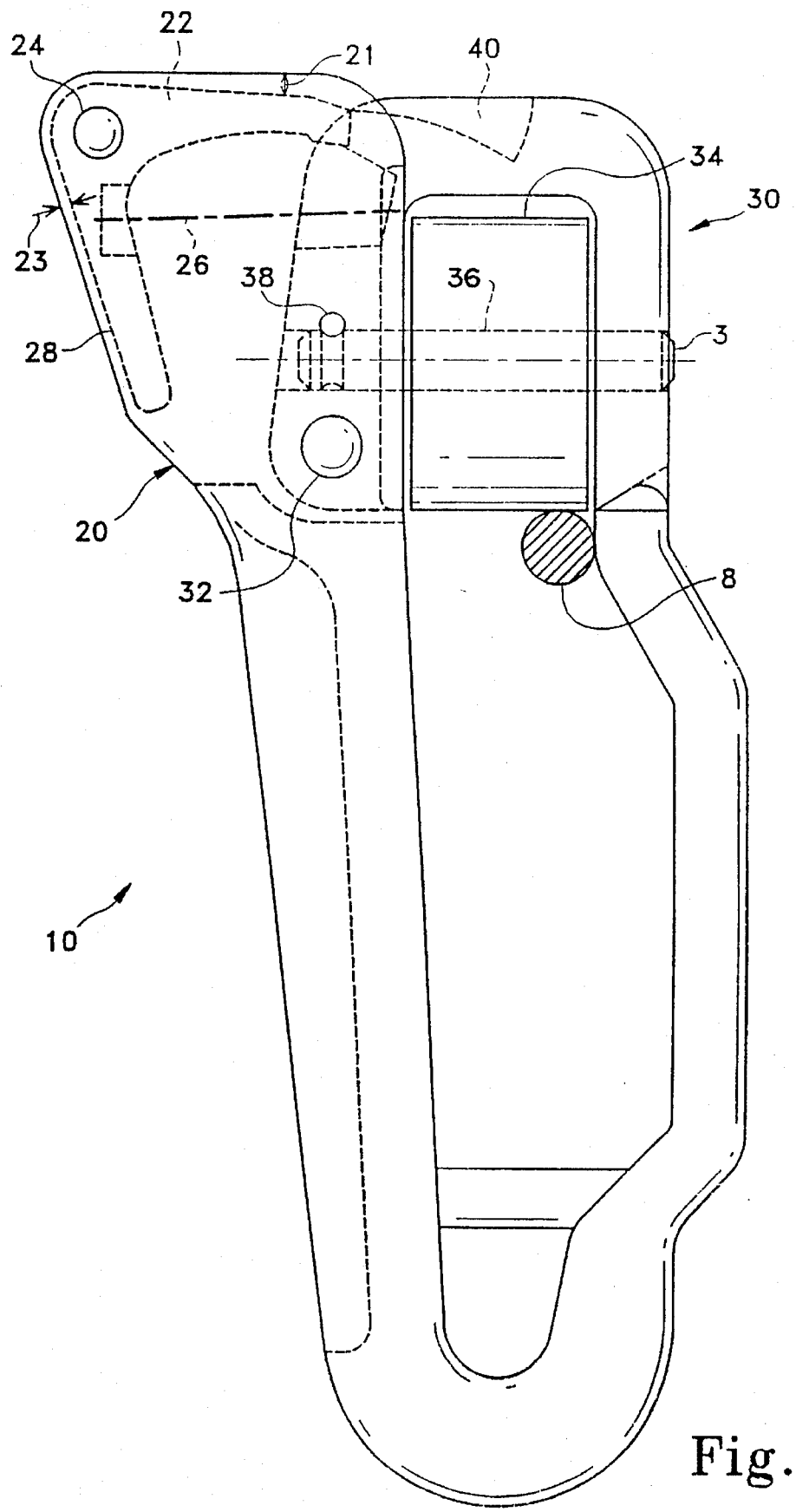
FIG. 1 shows a two dimensional representation of the present invention partially in fathom.

Referring now to the drawings in general, and in particular, to FIG. 1, a purse seine link 10 is shown. Purse seine link 10 comprises two major portions, a body 20 and roller head 30.

Body 20 comprises a substantially U-shaped section. A latch 22 is recessed in the upper portion of body 20. Latch pivot 24 attaches latch 22 to body 20. Spring 26 is normally in compression and keeps latch 22 in the position shown in FIG. 1.

Roller head 30 is attached to body 20 by head pivot 32. The major components of roller head 30 are roller 34 which is attached to roller head 30 by roller shaft 36. Roller shaft 36 is held in place by dowel pin 38.

Figure 2:
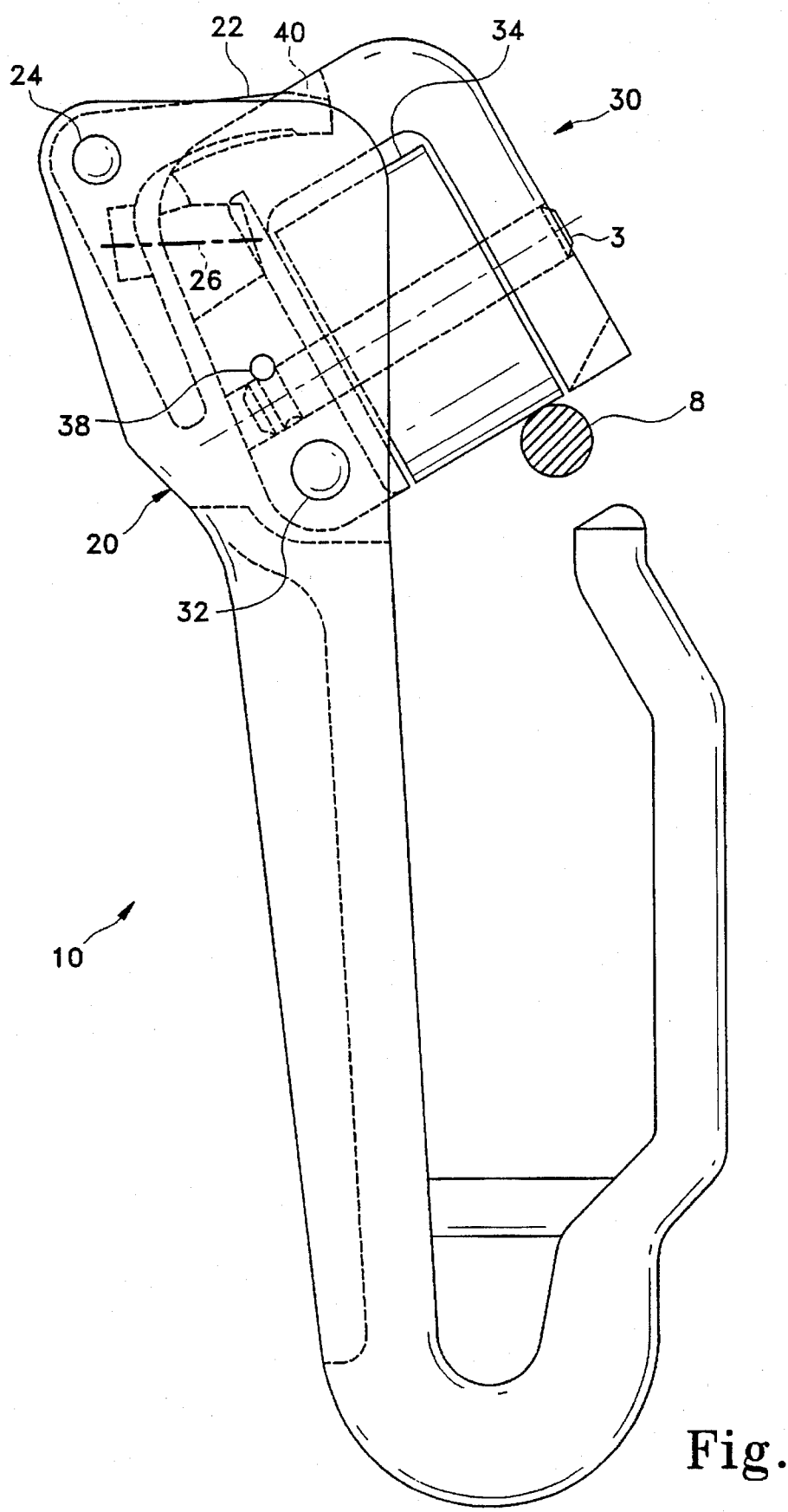
FIG. 2 shows the invention of FIG. 1 in the open position.

Referring now to FIG. 2, to remove purse seine link 10 from cable 8, an operator would strike the back of latch 22 further compressing spring 26. This causes latch 22 to pivot around pivot 24. The pressure of cable 8 on roller head 30 causes roller head 30 to rotate counter clockwise around head pivot 32. Latch 22 slips into recess 40 as shown. Rotation of roller head 30 allows cable 8 to slide off roller 34 and hence free of the length 10.

The amount of roller head 30 rotation about pivot 32 required for cable 8 to slide off roller 34 is dependent on the coefficient of friction between cable 8, roller head 30, and roller 34. In the preferred embodiment the tangent of the amount of rotation of roller head 30 about pivot 32 should be greater than approximately 0.4.

Its readily seen that this one step operation is both more efficient in terms of time required and in safety to the operator. Purse seine link 10 falls away from cable 8 after the one step operation of striking the back 28 of the latch 22.

Roller 34 has an outer diameter in the present invention of approximately 3 inches. Roller shaft 36 has an outer diameter of approximately ⅝ of an inch. This results in a roller to shaft ratio of approximately 4.8:1. Using a roller to shaft ratio this large increases the amount of torque on the roller shaft and prevents binding of the roller. Binding of the roller would cause additional wear on the roller and wear out the roller bearing sooner. This high ratio also overcomes the frictional forces which can develop in this corrosive at sea environment. This overcomes the problems associated with the rollers having a smaller roller to shaft diameter, which would cause the roller to bind causing the cable to slide over the roller grooving the roller and wearing the roller out. To operate in a corrosive sea water environment without additional lubricants, it is believed that a roller bearing ratio at least in excess of approximately 3.5:1 is necessary.

Figure 3:
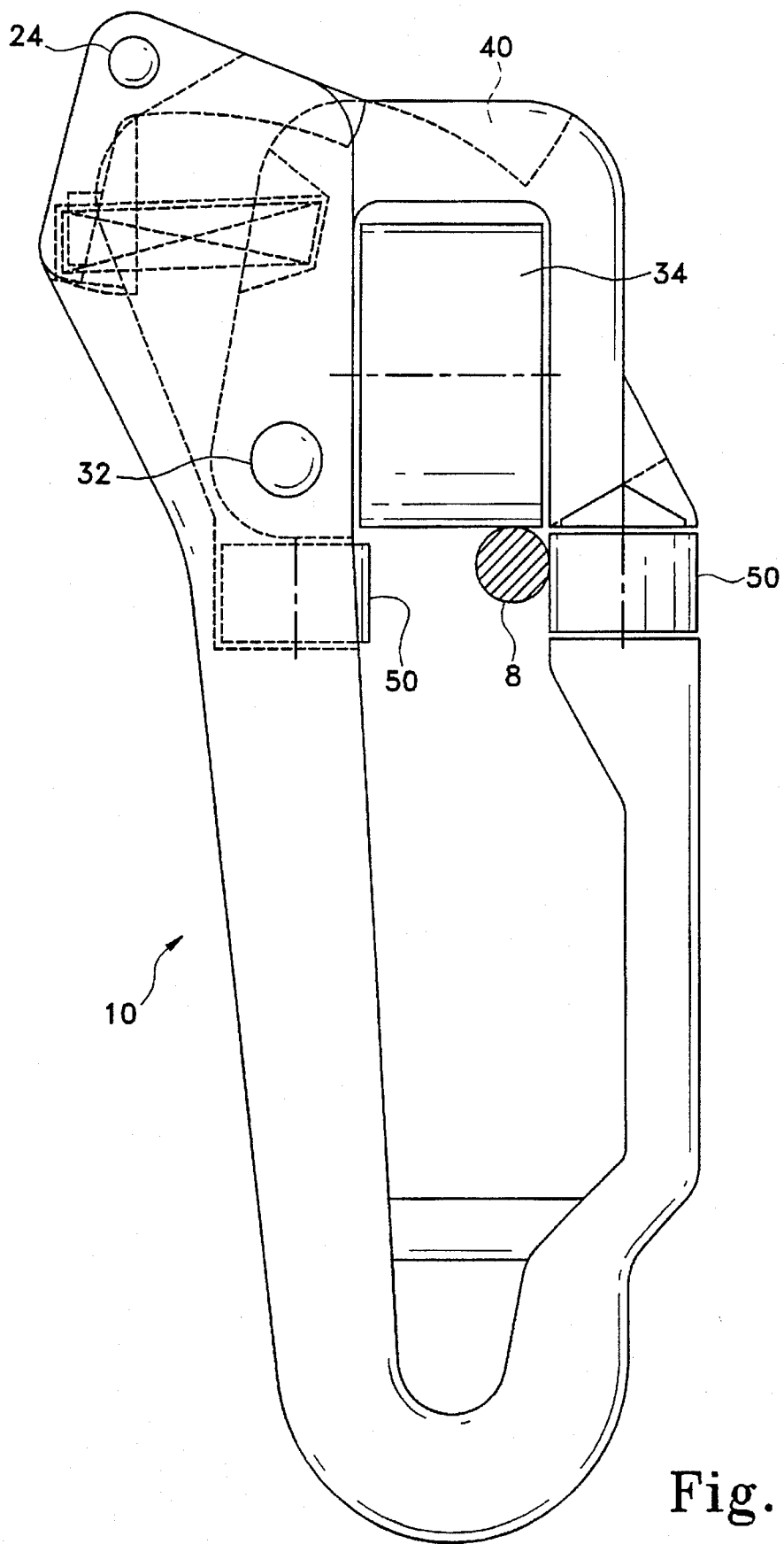
FIG. 3 is a side view of another embodiment according to the present invention partially in fathom showing two side rollers.

Referring now to FIG. 3, an additional embodiment is shown. Body rollers 50 are attached to body 20 by means of a shaft, not shown. Using body rollers 50, wear at the lip of body 20 is largely eliminated increasing the life of the purse seine link 10 and wear to the cable.

Body 20 contains top recess lip 21 and bottom recess lip 23. Top recess lip 21 provides protection for the latch mechanism 22 in the popped up position. Bottom recess lip 23 provides protection against accidental opening of the latch mechanism 22.

It takes a blow from a hammer or similar object designed to fit between the bottom recess lip 23 to force latch mechanism inward releasing roller head 30. Spring 26 provides a force to keep latch 22 in the closed position. In addition, once cable 8 has been released from purse seine link 10 the force of spring 26 operates to rotate roller head 30 in clockwise position closing purse seine link 10. Compressed spring 26 causes latch 22 to reengage the roller head 30 preventing the roller head from accidentally opening. This eliminates another manual step in the operation.

Figure 4:
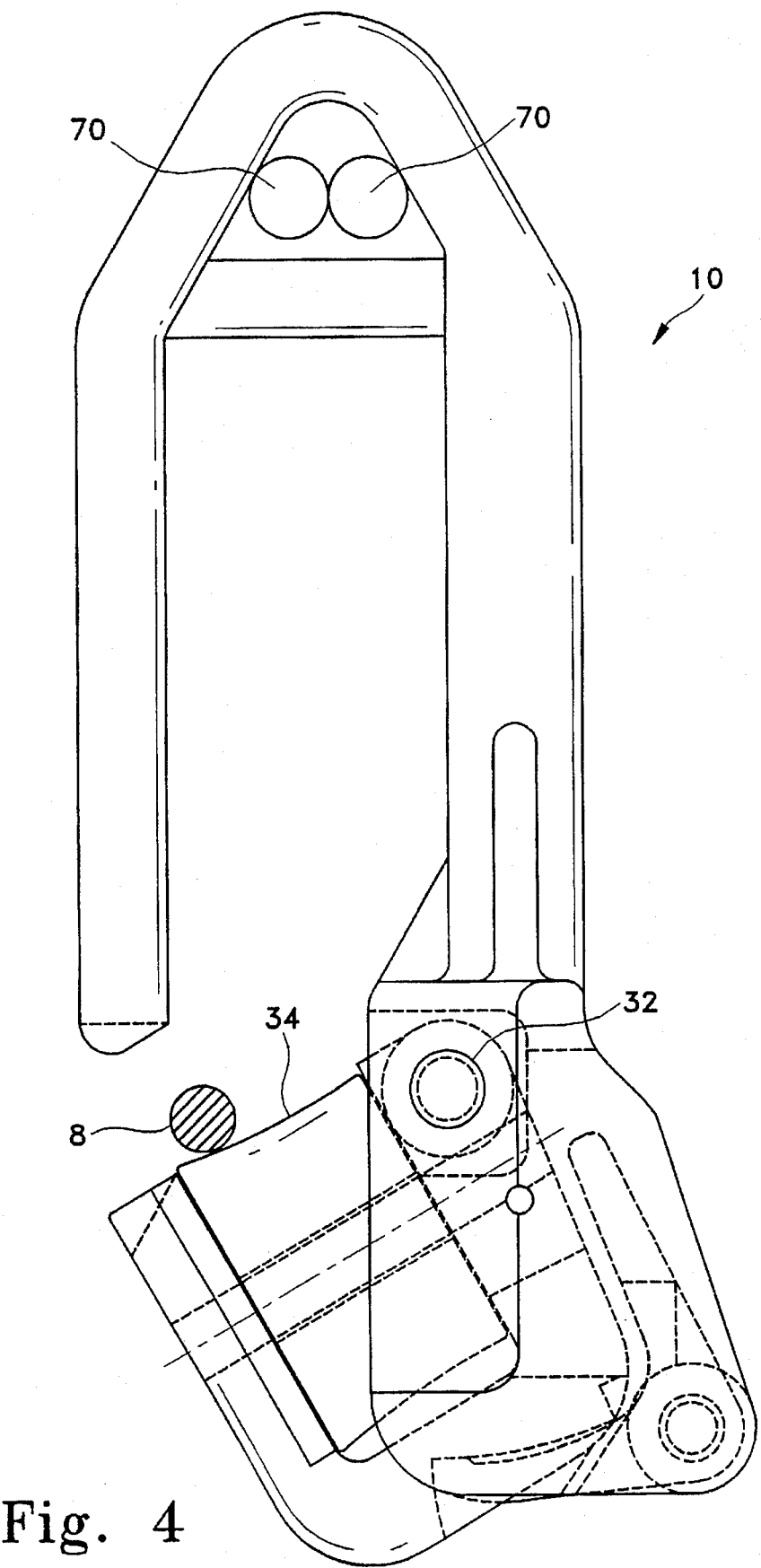
FIG. 4 is a plane view partially in phantom of the present invention.

Yet another embodiment is shown in FIG. 4. In this embodiment roller 34 is convex in shape. The shape has a radius approximately equal to the distance between the point at which net 70 is attached to purse seine link and the point at which cable 8 contacts the surface of roller 34. This shape keeps the cable forces normal to the roller surface and increases the wear area by ensuring the cable will not move axially along the roller as the cable is pulled across the roller. A cylindrical roller would tend to move the cable toward either end of the roller causing the roller ends and the body to wear. A "V" shaped roller would cause the cable to move toward the roller center, causing wear in only one area of the roller rather than equally distributing wear.

I claim:

1. A link for attaching a cable comprising:
    a body having opposing ends with one end adapted for engagement with another member and an opposing end for attachment to the cable, said body defining a center line extending between said opposing ends;
    said opposing end including a head attached by a pivot to said body, said head having a bearing surface in line with the center line and adapted for engagement with the cable whereby the cable applies a first force along said center line to said bearing surface, said pivot being offset from said first force such that the cable continuously applies a moment about said pivot when said link is in tension;
    a latch mechanism holding said head in a closed position;
    said latch mechanism releasing said head upon the application of a second force to said latch mechanism;
    whereby upon the application of said second force to said latch mechanism, said latch mechanism releases said head and said head pivots about said pivot, opening due to said continuous moment and allowing the cable to be released from said head in a one step operation.

2. A link as in claim 1 wherein said latch mechanism has an axis of rotation which is parallel to the axis about which the head pivots.

3. A link as in claim 1 wherein said latch mechanism is on said head.

4. A link as in claim 1 wherein said latch mechanism is pivoted from said open position to said closed position by a spring mechanism.

5. A link as in claim 1 wherein said bearing surface includes a roller attached to said head.

6. A link as in claim 1 wherein said head pivots at least approximately 20°.

7. A link comprising:
    a body:
    a roller head attached by a pivot to said body, said roller head having a roller;
    a latch mechanism holding said roller head in a closed position wherein said latch mechanism is released by a one step operation to open said roller head when said link is in tension; and
    a first body roller attached to said body adjacent to a lip on said body wherein said first body roller facilitates passage of a cable.

8. A link as in claim 7 wherein a second body roller is located opposite said first body roller wherein said second body roller facilitates passage of a cable.

9. A link as in claim 7 wherein said first body roller is attached to said roller head by a shaft and the ratio of the diameter of said first body roller to said shaft is approximately 3.5:1.

10. A link as in claim 7 wherein said roller is concave in shape.

11. A link for attaching a member to a cable comprising:
    a body having a part thereof for attaching the member;
    a roller head attached by a pivot to said body, said roller head having a roller;
    said roller having a surface concave in shape with the concave shape of said roller being approximately equal to a curve formed by a radius equal to the distance between a point at which the member is attached to said part and said surface of said roller; and
    a latch mechanism holding said roller head in a closed position wherein said latch mechanism is released by a one step operation to open said roller head when said link is in tension.

12. A link comprising:
    a body;

a roller head pivotally attached to said body, said roller head having opposed supports with a shaft extending therebetween, said shaft rotatably supporting a roller;

one of said supports having a lip engaging said body to attach a cable, said roller head pivoting said one of said supports and thus said lip into non-engagement with said body to release the cable;

wherein the outside surface of said roller is flush with said lip of said roller head to facilitate the smooth release of the cable in tension when said roller head rotates about its pivot and opens.

13. A link comprising:

a body;

a roller head attached by a pivot to said body, said roller head having a roller;

a latch mechanism holding said roller head in a closed position wherein said latch mechanism is released by a one step operation to open said roller head when said link is in tension;

said latch mechanism being held closed by a spring mechanism; and said spring mechanism automatically reclosing said roller head after a cable is released.

14. A link for attaching a cable comprising:

a body rotatably supporting at least one body roller;

a head pivotally attached to said body, said head having opposed supports with a bearing surface extending therebetween for supporting the cable;

one of said supports engaging a lip of said body to attach the cable, said head pivoting said one of said supports into non-engagement with said body to release the cable;

a latch mechanism holding said head in a closed position; and said at least one body roller being disposed on said body adjacent to and flush with said lip wherein said body roller facilitates passage of the cable.

15. A link comprising:

a body;

a head attached to said body by a pivot;

a latch mechanism holding said head in a closed position;

a spring mechanism holding said latch mechanism in a locked position whereby when said head opens to release a cable, said spring mechanism pivots said head from an open position to the closed position upon release of said cable.

16. A link comprising:

a body;

a roller head attached by a pivot to said body said head having a roller;

a latch mechanism holding said roller head in a closed position wherein said latch comprises a first and a second surface wherein said first surface engages said roller head wherein an impact on said second surface disengages said first surface from said roller head to open said roller head; and said latch pivoting about an axis which is parallel to the axis about which said roller head pivots.

17. A link comprising:

a body;

a head pivotally attached to said body;

a latch pivotally mounted on said body and holding said head in engagement with said body;

a spring having one end engaging said latch causing said latch to pivot into engagement with said head and another end in engagement with said head to pivot said head into engagement with said body.

* * * * *